C. T. McLELLAN & D G. DANNER.
EGG CANDLER.
APPLICATION FILED JAN. 13, 1916.
1,220,439.
Patented Mar. 27, 1917.
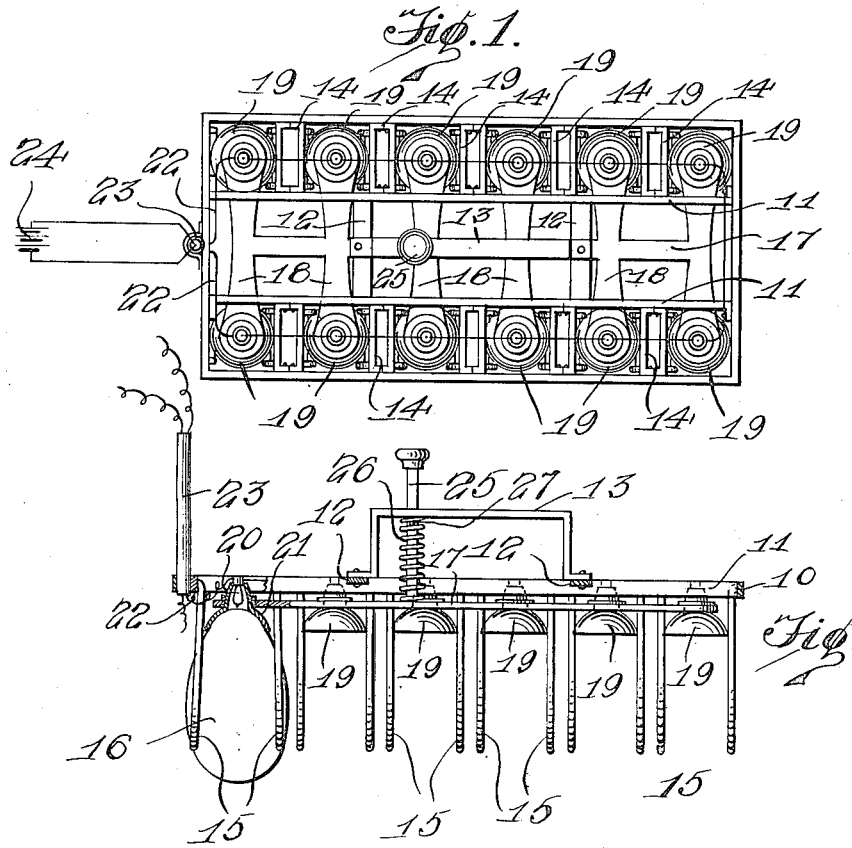
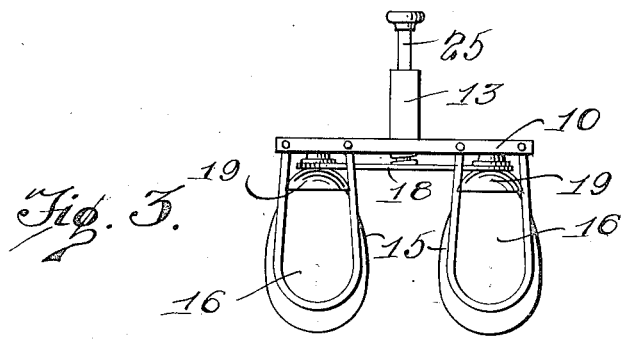
WITNESSES
INVENTORS
Charles T. McLellan
D. George Danner
BY
Richard B. Owen.
ATTORNEY

UNITED STATES PATENT OFFICE.

CHARLES T. McLELLAN AND D GEORGE DANNER, OF MINBURN, IOWA.

EGG-CANDLER.

1,220,439.

Specification of Letters Patent.

Patented Mar. 27, 1917.

Application filed January 13, 1916. Serial No. 71,976.

*To all whom it may concern:*

Be it known that we, CHARLES T. MC-LELLAN and D GEORGE DANNER, citizens of the United States, residing at Minburn, in the county of Dallas and State of Iowa, have invented certain new and useful Improvements in Egg-Candlers, of which the following is a specification.

This invention relates to an improved egg candler and the principal object of the invention is to provide a candler which is so constructed that a number of eggs may be raised out of a crate in a single operation and quickly candled and then if the eggs are all fresh, the candler placed over a second crate and the eggs simultaneously moved out of the holder.

Another object of the invention is to so construct the candler that small electric lights may be held behind the eggs thus providing the necessary light for candling.

Another object of the invention is to provide a candler having a frame so constructed that the eggs may be easily picked up and securely held by spring arms, plungers carrying the lights being provided for removing the eggs from the holding arms after they have been candled.

Another object of the invention is to provide a candler which will be strong and durable but at the same time light and convenient to handle.

Another object of the invention is to provide a candler which will be portable and permit of being moved about the room, thus making it unnecessary to remain in one position while doing the candling.

This improved candler is illustrated in the accompanying drawings, wherein:—

Figure 1 is a top plan view of the candler.

Fig. 2 is a view showing the candler in side elevation, one portion of the frame being broken away and shown in section.

Fig. 3 is an end elevation of the candler.

This candler is provided with a frame 10 having longitudinally extending bars 11 secured therein connected by the cross bars 12 which carry the handle 13. These longitudinally extending bars are positioned upon opposite sides of the longitudinal center of the frame and between the bars 11 and the side bars of the frame 10 there are positioned brackets 14 which carry the spring arms or clamps 15 to engage the eggs 16 as shown in Figs. 2 and 3. Therefore when it is desired to remove eggs from a crate to candle the eggs, the candler can be put in place with the eggs extending between the clamps or gripping arms 15 and by pushing downwardly upon the handle 13, the eggs will be moved between the clamps and engaged by these clamps so that when the candler or frame is raised again, the eggs will be drawn out of the crate.

The releasing mechanism by which the eggs may be forced out of the arms 15 includes a longitudinally extending bar 17 having arms 18 extending therefrom. These arms 18 extend as shown in Fig. 1 and have their free end portions provided with openings constituting sockets to receive the cups 19 into which the ends of the eggs will extend as shown in Fig. 2. These cups are provided at their upper ends with reduced necks in which the electric bulbs 20 are placed, the terminal sockets 21 of these bulbs being carried by the sockets or cups 19 and connected in series by wires 22 which pass through the tubes 23 and are connected with the battery or other source of current 24. A plunger 25 is slidably connected with handle 13 and a spring 26 is positioned between the handle 13 and longitudinally extending bar 17, a pin 27 extending from the plunger 25 to engage the spring so that when the plunger is moved downwardly and then released the spring will return the plunger to the raised position.

After the eggs have been candled, any of which are not fresh can be removed by hand and the remainder can then be removed by placing the candler over a second crate to hold the good eggs and then pushing the plunger downwardly thus forcing the eggs from between the gripping arms through the medium of the cups 19. It will thus be seen that with this device, the eggs can be quickly removed from the crate and then turned to candle them after which the eggs of all found to be good, can be easily transferred to a second crate. It will be further noted that this device is very light and durable and therefore can be handled very easily thus permitting the eggs to be rapidly candled.

What is claimed is:—

1. A candling device comprising a frame having side and end bars, longitudinally extending bars extending between said end bars, cross bars connecting said longitudinally extending bars, brackets positioned between said longitudinally extending bars and said side bars, a handle carried by said cross bars, resilient gripping means carried by said brackets, a plunger slidably carried by said handle, a longitudinally extending bar connected with said plunger and provided with side arms extending between said resilient gripping means, egg engaging cups carried by said side arms, lamp sockets carried by said cups, resilient means yieldably holding said plunger in a raised position, and a lighting circuit connected with said lamp sockets.

2. A candler including a frame, brackets carried by said frame, resilient gripping means carried by said brackets, a handle for said frame, a plunger slidably carried by said handle, a longitudinally extending bar connected with said plunger and provided with side arms extending between said resilient gripping means, egg engaging cups carried by said side arms, and lamp sockets carried by said cups.

3. A candler comprising a frame, egg engaging means connected with said frame, egg removing means including arms extending in operative relation to said egg gripping means, egg engaging cups carried by said arms, lamp sockets carried by said cups, and actuating means for said egg removing means.

4. A candler comprising a frame, gripping means connected with said frame, removing means movably connected with said frame and extending in operative relation to said gripping means, and means connected with said removing means for holding an illuminating element.

5. A candler comprising a frame, gripping means connected with said frame, removing means connected with said frame and extending in operative relation to said gripping means, egg engaging elements for said removing means having extensions constituting pockets, and means connected with said pockets whereby an illuminating agent may be held in the pockets.

In testimony whereof we affix our signatures in presence of two witnesses.

CHARLES T. McLELLAN.
D GEORGE DANNER.

Witnesses:
R. E. LANGFITT,
C. B. TYER.